(12) United States Patent
Feuerhahn (10) Patent No.: US 10,926,833 B1
(45) Date of Patent: Feb. 23, 2021

(54) BICYCLE PEDAL SYSTEM INCLUDING PEDAL BODY AND CLEAT PLATE

(71) Applicant: Martin Feuerhahn, Taipei (CN)

(72) Inventor: Martin Feuerhahn, Taipei (CN)

(*) Notice: Subject to any disclaimer, the term of this patent is extended or adjusted under 35 U.S.C. 154(b) by 0 days.

(21) Appl. No.: 16/926,626

(22) Filed: Jul. 10, 2020

Related U.S. Application Data (60) Provisional application No. 62/882,130, filed on Aug. 2, 2019.

(51) Int. Cl.
*B62M 3/08* (2006.01)
*B62M 1/36* (2013.01)

(52) U.S. Cl.
CPC .............. *B62M 3/086* (2013.01); *B62M 1/36* (2013.01)

(58) Field of Classification Search
CPC ........... B62M 1/36; B62M 3/08; B62M 3/086
See application file for complete search history.

(56) References Cited

U.S. PATENT DOCUMENTS

| | | | | |
|---|---|---|---|---|
| 4,815,333 A | * | 3/1989 | Sampson | B62M 3/086 36/131 |
| 2002/0100343 A1 | * | 8/2002 | Okajima | B62M 3/08 74/594.4 |
| 2004/0089098 A1 | * | 5/2004 | Plassiard | B62M 3/086 74/594.6 |
| 2009/0139369 A1 | * | 6/2009 | Takahama | B62M 3/086 74/594.6 |
| 2009/0158888 A1 | * | 6/2009 | Coderre | B62M 3/086 74/594.4 |
| 2012/0055282 A1 | * | 3/2012 | Chen | B62M 3/08 74/594.4 |

* cited by examiner

*Primary Examiner* — Prasad V Gokhale (57) ABSTRACT

A bicycle pedal system for connecting a shoe to a bicycle pedal includes a cleat plate, adopted for mounting onto a sole of the shoe, and a pedal body. The pedal body has a first surface, an opposing identically shaped second surface with multiple slots therein, and the cleat plates having attachment members of complementary shapes engaging selectively with the pedal and positioning the shoe.

15 Claims, 8 Drawing Sheets

BICYCLE PEDAL SYSTEM INCLUDING PEDAL BODY AND CLEAT PLATE

CROSS REFERENCE TO RELATED APPLICATIONS

This application claims priority to U.S. provisional patent application No. 62/882,130, filed on Aug. 2, 2019 with the United States Patent and Trademark Office, titled "SAFETY PERFORMANCE BICYCLE PEDAL SYSTEM", which is incorporated by reference in the present application in its entirety.

TECHNICAL FIELD

The present invention relates to a pedaling system for connecting a shoe to bicycle pedal, or similar apparatus. The invention also relates to the portions of the system that are affixed to the pedal as well as to the shoe.

DESCRIPTION OF RELATED ART

A bicycle pedal is the part of a bicycle that a cyclist pushes with his/her foot to propel the bicycle. It provides the connection between the cyclist's foot or shoe and the crank allowing the leg to turn the bottom bracket spindle and propel wheels of the bicycle.

Early bicycles used a spindle that threads into the end of the crank and were free to rotate on bearings with respect to the spindle.

One advancement increasing pedaling power include a pedal body attached to the spindle that adds a platform which the rider may place his foot. The pedal body increased the surface available for the power transfer and the traction between shoes and pedal but did not prevent the shoe or foot from accidentally slipping off the pedal.

U.S. Pat. No. 546,412 discloses a toe clip that affixes a shoe to the pedal preventing it to slip off. Toe clip systems forming a kind of cage using a clip and strap and are not allowing a quick release of the shoe when the cyclist needs to set a foot on the ground during a stop or in case of any emergency requiring him to disengage with the pedal.

U.S. Pat. No. 550,409 discloses a method of connecting the shoe to the pedal through a latch system. This clipless design required the user to actively engage and disengage positioning his shoe to the right position and then turning it to lock in. This foot rotation is not a natural movement and bears the risk that the user will fall with the bicycle while attached to the bicycle. Also, it adds significant weight to the pedal and therefore increases the effort necessary turning the crank.

U.S. Pat. Nos. 4,662,090 and 5,211,076 describe systems that do not lock or clamp the shoe to the pedal and using one or more rectangular recesses complementary to the shape of the pedal. To their disadvantage these requires a large sole and with the recesses across the entire sole do not provide a defined positioning of the shoe, it can be placed closer or further to crank. The user will therefore have look down and place his shoes in the right positions. Without a lateral fixation it still can slip off the pedal entirely sidewise.

U.S. Pat. No. 6,725,742 discloses another non-locking connection of a shoe with soccer studs and the pedal, which has recesses. The disadvantages are requiring the user to look down and carefully placing his shoes in the right position. And since the studs' shapes are not an exact match with the recesses' geometry, it does not place the shoe in one unique position. The use of studs further reduces the surface area between pedal and shoe.

The above-mentioned clipless design has been advanced reducing the weight of the pedal and cleat system and improving usability.

Such advancements include the introduction of cleats with different degrees of float angles for the approximately same pedal. The float is measured in degrees and is the amount by which the foot can move before releasing from the pedal. It allows the user to adjust his/her foot, ankle, and knee position while riding.

Further advancement include the use of 3-bolt connections between cleat and road bike shoe that allows the user during the installation of the cleat to position it to what is believed the optimum position for power transfer, with the axis of the metatarsophalangeal joint aligned with the axis of rotation of the pedal.

Currently, the most widely used connecting devices are the clipless cleat/pedal systems mentioned hereinabove. Clipless pedals are a system of matching pedals mounted to the bike and cleats bolted to the shoe. The user then steps into the pedal and clicks the cleat into the pedal using a vertical force overcoming resistance from a spring mechanism that then hold the shoe firmly in place. These systems are therefor as well called step-in or clip-in pedals.

The disadvantages of these clip-in systems are the complexity associated with engaging and disengaging the shoe from the pedal. The user has to place the shoes into the right position to step-in and laterally rotate the feet to disengage, to unclip, and will have to practice particularly this disengagement movement since it requires to apply a certain angle and force.

This required disengaging process is the main disadvantage and safety concern of today's clipless pedals. The user's natural reaction in a case of emergency is to pull his/her shoe out vertically, not to twist in the horizontal plane.

Users of clipless pedals often fail to disengage in a case of emergency, lose balance and consequently fall while still attached to their bikes. Or, in case of a crash caused by other reason, like a hit by a vehicle, they cannot disengage and get dragged along while attached to their hikes.

Other disadvantages are the requirement to use shoes adapted for use in the clip-in pedals. The shape of these pedals does not allow alternative use with conventional shoes or barefoot use. In other words, the user will always have to wear special shoes even for a short leisure ride. These bike shoes may be difficult or uncomfortable to walk in the shoes because of the hard, rigid sole and the cleat extending from the sole.

Further disadvantages of clipless pedal systems are the limitation of "float" options and the increasing complexity when applying float to these pedal systems. Cyclists refer to the degree of freedom to rotate or pivot the shoe once connected to the pedal as "float" and if there is no float it is referred to as "fixed". Fixed or various degrees of floating connections are individual user preferences.

Applying float to clipless pedal systems increase the complexity of disengagement. Since the users are required to twist the shoe to disconnect and the float provides a specific degree of freedom to rotate while staying engaged they know have to twist their shoe further, beyond the float angle, and therefore making it more difficult to disengage, particular in an emergency situation.

U.S. Pat. No. 8,794,105 describes a device connecting a shoe with a pedal using attachment members of complimentary shapes. The disadvantages are that is does not allow for floating and fixed shoe positioning. It can't be used with road bike shoes available in the market, and it can't be aligned to match the user's axis of the metatarsophalangeal joint with the axis of rotation of the pedal.

Accordingly, there is a need in the art for a pedal system which mitigates inadvertent slippage of the rider's shoe from the pedal, facilitates blind positioning of the shoe, allows for fixed and floating use, alignment of the user's metatarsophalangeal joint with the axis of rotation of the pedal, and alternative use with road bike shoes, conventional shoes and barefoot.

DETAILED DESCRIPTION

The present disclosure provides a pedal system. In order to make the purpose, technical solutions, and effects of the present disclosure clearer, the present disclosure will be further described in detail below with reference to the accompanying drawings and embodiments. It should be understood that the specific embodiments described herein are merely used to explain the present disclosure, and are not to used to limit the present disclosure.

Figure 1:
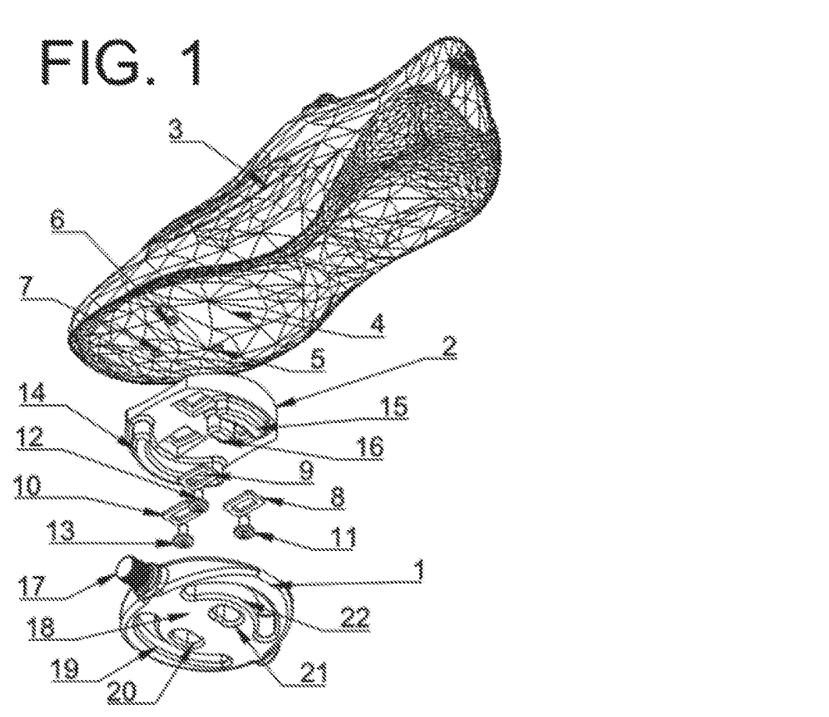
FIG. 1 is an exploded perspective view of a pedal, a cleat-plate, and a shoe.
Figure 2:
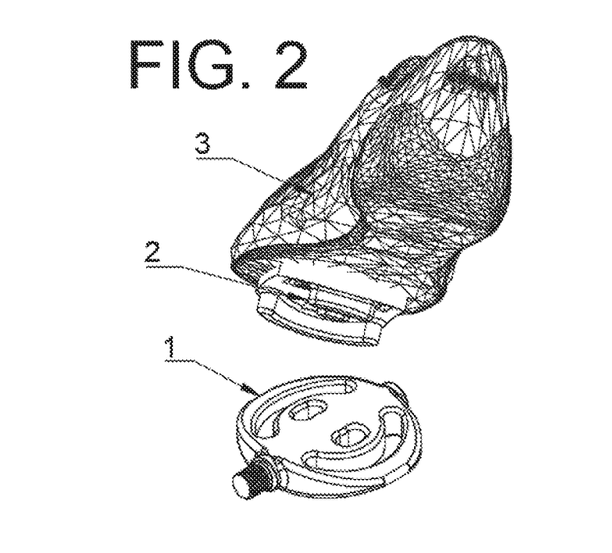
FIG. 2 is an exploded perspective view of a shoe/cleat assembly and the pedal prior to mutual connection.
Figure 3:
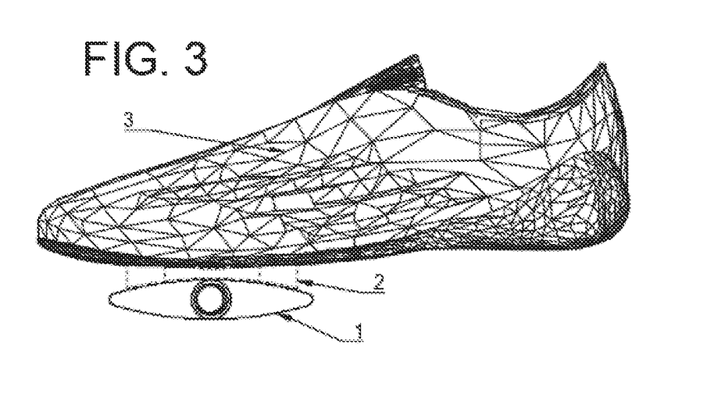
FIG. 3 is a side view of shoe/cleat-plate assembly connected with the pedal.

Referring now generally to FIGS. 1 to 3, a pedal system for connecting a bicycle shoe 3 to a pedal 1 during the various stages of assembly is shown. As it is known, the road bicycle shoe 3 has a sole 4 made of rigid material with a triangular pattern of three threaded holes 5, 6, and 7.

The cleat plate 2 has a matching pattern of recesses for washers 8, 9, and 10.

Screw 11 and washer 8 mount the cleat plate 2 to thread 5, screw 12 and washer 9 to thread 6 and screw 13 and washer 10 to thread 7. Of course, it is understood that other fixing means are applicable.

The cleat plate 2 is formed to be concave front to rear on the side engaging with the shoe and the side connecting to the peal to conform to the correspondingly convex forms of sole 4 and pedal 1 and has three arc-shaped protruding cleat elements, 14, 15, and 16.

Cleat 14 is located in front of the plate 2 and cleat 15 at the back and both have the approximately same arc diameter and cleat thickness. Cleat 16 has a smaller diameter and is located between cleat 14 and 15.

The pedal 1 consists of an articulation axle 17 attachably connectable with a crank arm (not shown) of a bicycle and a pedal body 18 with four arc shaped slots, 19, 20, 21 and 22 forming top and bottom identical pedal sides with matching geometry to the cleat plate's 2 cleats 14, 15 and 16.

FIG. 2 illustrates a cleat plate 2 mounted to shoe 3 before being attachably engaged with pedal 1. Cleat plate 2 may be connected to either side of the pedal 1 when the user steps onto the pedal 1. The user can connect with the pedal 1 in a blind fashion from various approach angles, using a downward force, deviating from a perfect straight longitudinal and lateral path to connection due the shapes of the pedal body 18 with arc shaped slots 19, 20, 21, and 22, their transitional edges in form of uniformly dimensioned chamfers CH1, CH2, CH3, and CH4 (FIG. 4D) and matching geometry cleats 14, 15 and 16 in combination with the convex formed pedal body 18 and concave formed cleat plate 2 guiding the user's shoe 3 into the unique connection position.

Figure 4A:
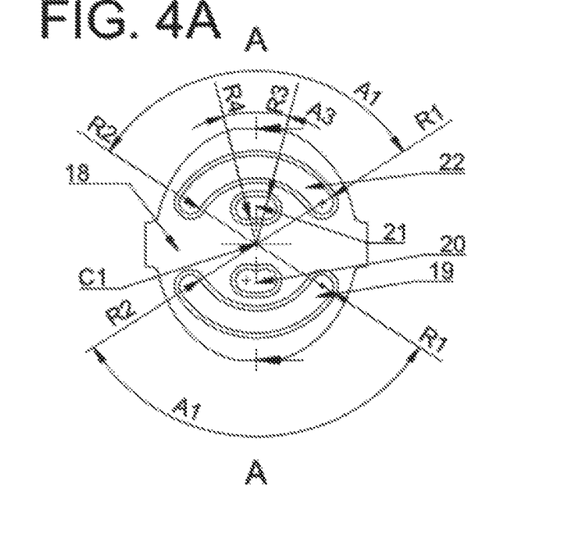
FIG. 4A is a top view of a pedal body.
Figure 4B:
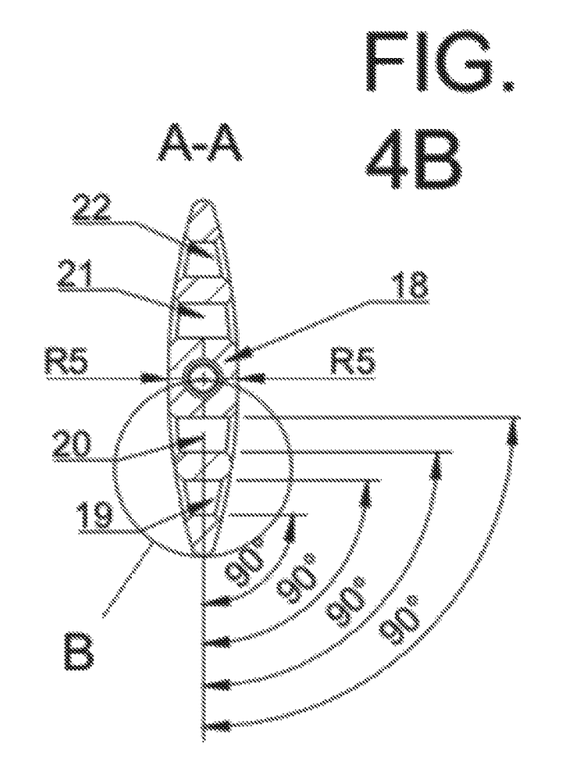
FIG. 4B is a cross-sectional view of the pedal body along the line A-A of FIG. 4A.
Figure 4C:
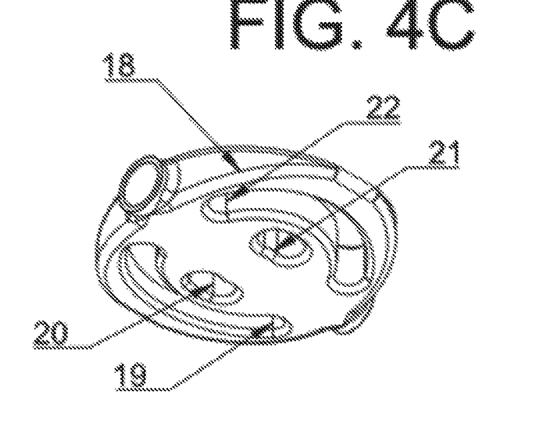
FIG. 4C is a perspective view of the pedal body.
Figure 4D:
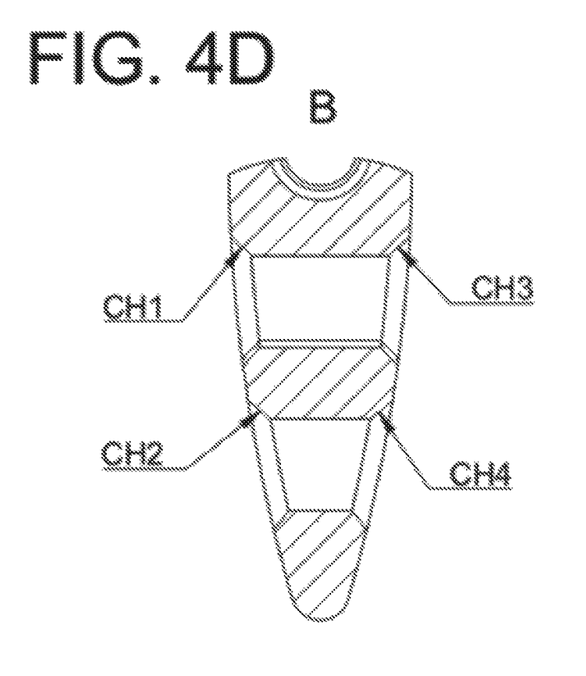
FIG. 4D is a detail view of selection B of the pedal body in FIG. 4B.

FIG. 3 shows the cleat 2 mounted to shoe 3 and connected to pedal 1 after the user stepped into pedal As shown in FIGS. 4A, 4B and 4C, pedal body 18 has a double symmetry with respect to its axis of rotation. FIG. 4A shows slot 19 and 22 share the approximately same arc dimensions with identical outer arc radius R1, inner radius R2, center point C1 and the arc angle A1. Slot 20 and 22 are as well shaped in the form of arcs centered on C1 with arc angle A3, outer radius R3 and inner radius R4. Their identical outer radius is smaller than R2, and they share inner radius and arc angle A3. FIG. 4B illustrates the slots 19, 20, 21 and 22 are shaped perpendicular to the axis A-A. The pedal body 18 is formed to be convex front to rear with radius R5 on both sides (see FIG. 4B). Consequently, the pedal body 18 has two symmetric sides, each of them having four-arc shaped slots allowing the user to step-in from both sides of the pedal. The perpendicularly cut slots 19, 20, 21 and 22 allows the user to simply step out the pedal any time desired and facilitates the removal of dirt and stones that are simply fall or being pushed through the slots by the matching cleats 14, 15 and 16. FIG. 4D illustrates uniformly dimensioned chamfers CH1, CH2, CH3 and CH4 providing transitional edges for the cleats 14, 15, and 16 when sliding into slots 19, 20, 21 and 22.

Figure 5A:
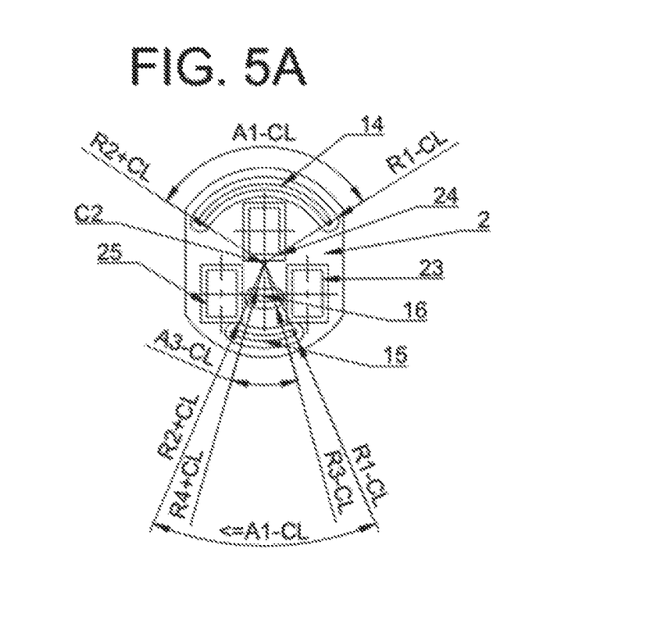
FIG. 5A is a top view of the cleat-plate.
Figure 5B:
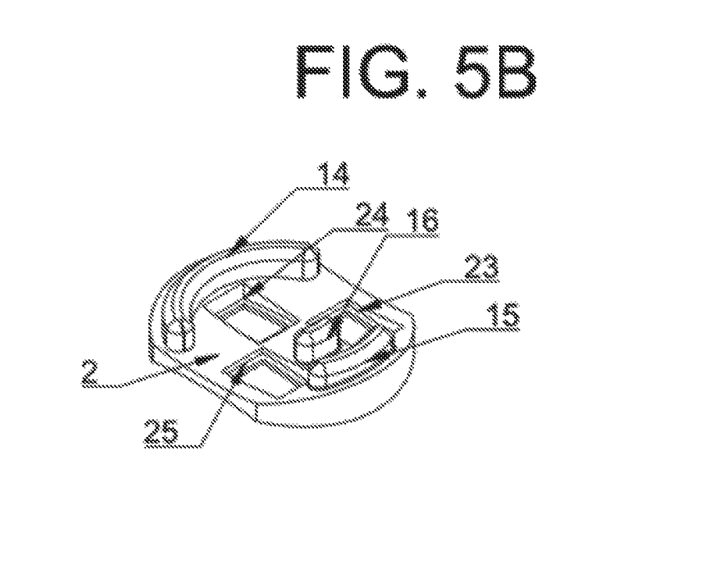
FIG. 5B is a perspective view of the cleat-plate.
Figure 5C:
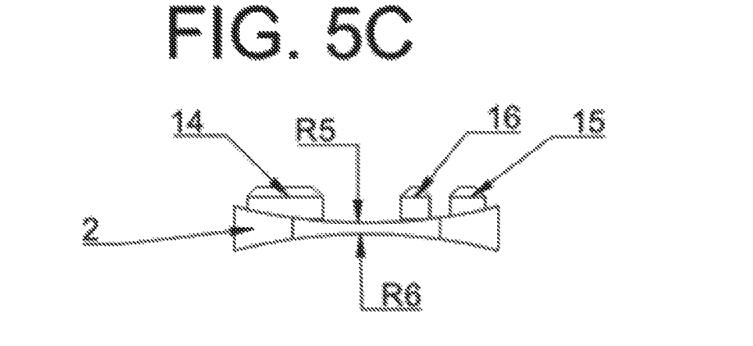
FIG. 5C is a side view of the cleat plate.

FIGS. 5A, 5B and 5C illustrate the cleat plate 2 with the cleats 14, 15 and 16. FIGS. 5A and 5B in illustrate well the three recesses 23, 24, and 25 for the washers that match the triangle thread pattern of a commonly available road bike shoe and serve the purpose to host the bolts 11, 12, and 13 and washers 8, 9 and 10 used connecting the cleat-plate 2 to the shoe 3 (see FIG. 1)

It is an important thing for slots 19, 20, 21 and 22 and cleats 14, 15, 16 and cleat plate 2 to have complementary shapes and dimensions provided to allow nesting with a slight clearance. FIG. 5A illustrates the cleats 14 and 15 are arc shaped complementary to slots 19 and 22 with their outer arc radius being identical to the outer radius R1 of slot 19 and 22 minus a small clearance CL and their inner radius being identical to the inner radius R2 of slot 19 and 22 plus a small clearance CL. Cleat 16 is arc shaped and complimentary to slot 20 and 21 with an outer radius identical to the outer radius R3 of slots 20 and 21 minus a small clearance CL and with an inner radius identical to the inner radius R4 of slots 20 and 21 plus a small clearance CL1. Consequently, the cleat plate's 2 center point C2 is a direct projection of center point C1 (see FIGS. 4A and 5A).

As FIG. 5C illustrates shaped cleat plate 2 is formed to be concave front to rear with the matching radius R5 on the side facing the pedal body 18 and radius R6 that approximately matches the convex shape of the shoe's 3 sole 4 (see FIG. 1).

FIG. 5A illustrates one embodiment where cleat's 14 arc angle A2 is identical to arc angles A1 of slots 19 and 22 minus a small clearance CL. The arc angle of cleat 15 is smaller or approximately same than arc angle A1 minus a small clearance CL and the arc of cleat 16 is identical of the arc angle A3 of slots 20 and 21 minus a small clearance CL. Once connected the cleats 14, 15 and 16 are nested into the corresponding slots they provide abutment. In this version of the invention the cleats cannot rotate around center point C2 and therefore the shoe can't rotate either. Cyclists refer to the degree of freedom to rotate or pivot the shoe as "float" and if there is no float, as in this version of the invention, it is referred to as a "fixed" connection. Fixed connection or floating connections with various degrees of floating are individual user preferences.

Another aspect of the innovation is that in a symmetric and asymmetric floating configuration, the convex shaped pedal body with arc shaped slots/recesses and the matching concave cleat plate body with complimentary to the slots shaped perpendicular protruding cleats will return the cleat plate to a neutral nesting position within the pedal when a pressing force is applied to these complimentarily shaped bodies. The convexity and concavity align the bodies until they are complimenting each other. Such pressure is applied with each pedal stroke allowing a defined position of the cleat in relation to the pedal during the power phase of the stroke. The power phase characterizes the area of the pedal rotation where the user applies the maximum force, typically when the crank is in the 3-o'clock downstroke position. Once the pedal moves out of this power phase, this aspect of the innovation allows the cleat to pivot within the degree of float before it is aligned again during the next downstroke to its neutral position.

That is an important aspect since it allows the user to automatically find this position back with each stroke, so the user has the "perfect" stroke, but during the no-power phase, his cleat/shoe/foot can pivot, which lowers the pressure for the joints. This helps reduces development of joint pain and other stress related issues of a fixed position.

Figure 6A:
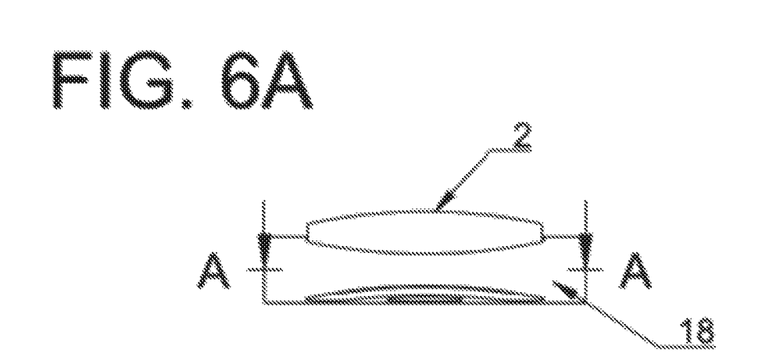
FIG. 6A is a front view of the cleat plate connected to the pedal body.
Figure 6B:
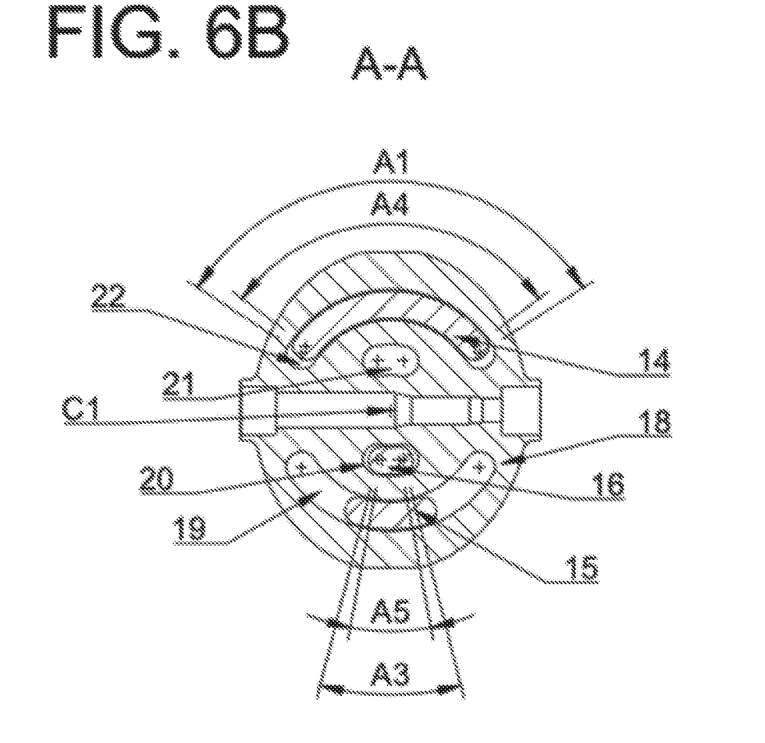
FIG. 6B is a cross-sectional view along the line A-A of FIG. 6A.

FIG. 6B illustrates another embodiment where cleat's 14 arc angle A4 is smaller than the arc angles A1 of the slots 19 and 22. The arc angle of cleat 15 is smaller or approximately same than the arc angle of cleat 14 and the arc angle A5 of cleat 16 is smaller than the arc angle A3 of the slots 20 and 21, with the difference preferable approximately same as between A1 and A4. This configuration allows the cleat to be rotated around C1. The difference in the arc angle degrees A1 to A4 respectively A3 to A5 is the float angle.

This float will be symmetric and allowing the cleat plate 2 and shoe 3 to rotate clockwise and counterclockwise equally if the arc degree differences are applied symmetric to the arcs. The float can be configured to be asymmetrically by applying different degrees of arc angle difference to the cleat edges contacting the slots walls when rotated clockwise respectively counterclockwise.

Figure 7:
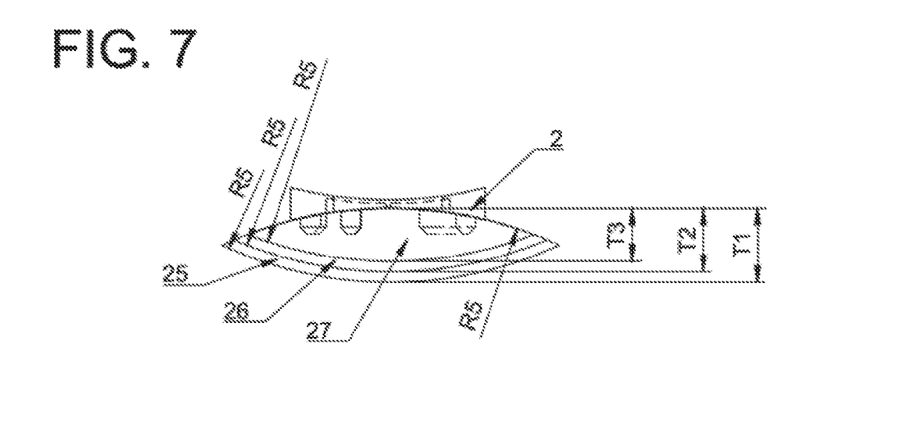
FIG. 7 is a side view of the cleat plate connected to three alternative pedal bodies.

FIG. 7 illustrates another aspect of the innovation with the identical system geometry can be used to produce pedals of various sizes that are all system compatible with cleat plate 2. While all three pedal bodies 25, 26, 26 share the radius R5 for the convex shape from front to back on both sides, pedal body 25 has applied thickness T1, pedal body 26 has applied thickness T2 and pedal body 27 has applied thickness T3. Therefore, the approximately same slot and cleat geometry can be used to produce pedals of small size, thin and lightweight, commonly preferred characteristics for performance biking as well as to manufacture large pedals with a large surface for leisure biking. Consequently, the user will be able to use the approximately same bike shoe 3 with the mounted cleat plate 2 to use different pedal formats and therefore different purpose bikes.

Figure 8:
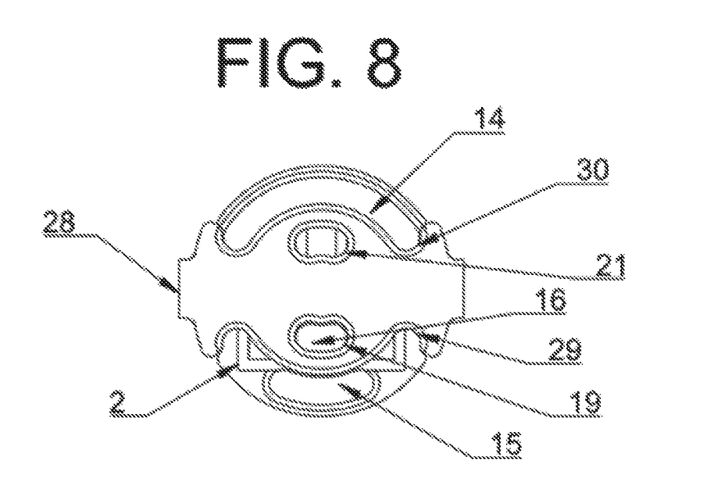
FIG. 8 is a bottom view of the cleat plate connected to an alternative pedal body.

Another aspect of the innovation is that the system's geometry can be further modified to reduce the size of the pedal body while maintaining all above discussed advantages. FIG. 8 illustrates a pedal body 28 that has been modified by removing the outer boundaries of the slots 19 and 22. Cleats 14, 15 and connect to the half slots 29 and 30 and cleat 16 to slots 20 or 21 providing abutment to cleat plate 2.

Thus, it should be understood that the system includes the convex shaped pedal body with arc shaped slots/recesses and the matching concave cleat plate body with complimentary to the slots shaped perpendicular protruding cleats securing the correct shoe position while allowing graduated fixed and floating connections, including different float angles for clock and counter clockwise movement, using cleat plates with variations within the systems geometry.

Further, the body of the pedal has a double symmetry with respect to its axis of rotation. Consequently, the pedal has two symmetric sides, each of them having four-arc shaped slots allowing the user to step-in from both side of the pedal.

According to one embodiment, the complementary arc-shaped cleats and slots, convex formed pedal body and corresponding concave cleat plate provide a multi-dimensional guide that facilitates the engagement of shoe to pedal, even in a blind fashion.

Further, due to this construction the approximately same system geometry can be used to produce pedals of various sizes that are all system compatible, pedals of small size, thin and lightweight, commonly preferred characteristics for performance biking as well as large pedals with a large surface for leisure biking.

Further, the pedal body shape allows the general use with regular shoes and even barefoot. The user does not always have to wear specific bike shoes thus extending the usability of the bike.

It can be understood that those of ordinary skill in the art can make equivalent replacements or changes according to the technical solutions and the concepts of the present disclosure, and all such changes and replacements should be encompassed within the protection scope of the claims appended to the present disclosure.

What is claimed is:

1. A bicycle pedal system, comprising:
   a front to rear convex-shaped pedal body comprising a first slot, a second slot, a third slot, and a fourth slot, wherein the first slot, the second slot, the third slot, and the fourth slot are all arc-shaped, share a common center point of the pedal body, and defined through a width of the pedal body, and further comprising an articulation axle attachably connectable with a crank arm of a bicycle; and
   a front to rear concave-shaped cleat plate attachably engageable with the pedal body, the cleat plate comprising a first cleat, a second cleat, a third cleat, and three slots; the three slots arranged in a triangular fashion, wherein the first cleat, the second cleat, and the third cleat are all arc-shaped and share a common center point of the cleat plate, wherein the cleat plate is connectable to a shoe via the slots;
   wherein upon a downward force, the cleat plate engages with the pedal body via the first cleat or second cleat passing through the first slot or second slot of the pedal body and the third cleat passing through the third slot or the fourth slot of the pedal body such that the common center point of the pedal body is directly projected on the common center point of the cleat plate.

2. The bicycle pedal system of claim 1, wherein the pedal body is symmetrical along two sides of itself.

3. The bicycle pedal system of claim 2, wherein the first slot of the pedal body is symmetrical to the second slot of the pedal body along the common center point of the pedal body, and wherein the third slot of the pedal body is symmetrical to the fourth slot of the pedal body along the common center point of the pedal body.

4. The bicycle pedal system of claim 2, wherein radii of the first slot and the second slot of the pedal body are greater than radii of the third slot of the pedal body and the fourth slot from the common center point of the pedal body.

5. The bicycle pedal system of claim 2, wherein arc lengths of the first slot and the second slot of the pedal body are greater than arc lengths of the third slot of the pedal body and the fourth slot from the common center point of the pedal body.

6. The bicycle pedal system of claim 1, wherein inside edges of the three slots of the cleat plate are chamfered.

7. The bicycle pedal system of claim 1, wherein the first cleat, the second cleat, and the third cleat are shaped and dimensioned to mate with first slot or second slot of the pedal body, the first slot or second slot of the pedal body, and the third or fourth slot of the pedal body, respectively.

8. The bicycle pedal system of claim 1, wherein a degree of concavity of the concave body of the cleat plate approximately matches a convexity of a sole of the shoe.

9. The bicycle pedal system of claim 1, wherein engagement of the cleat plate with the pedal body allows for abutment of the first cleat, the second cleat, and the third cleat within the first slot, the second slot, and the third or fourth slot, respectively of the pedal body.

10. The pedal system of claim 1, wherein arc angle of the first cleat is approximately same as arc angle of the first slot and second slots of the pedal body, wherein arc angle of the second cleat is less than or equal to arc angle of the first slot and second slots of the pedal body, and wherein arc angle of the third cleat is approximately same as arc angle of the third slot and the fourth slot of the pedal body.

11. The pedal system of claim 1, wherein arc angle of the first cleat is less than arc angle of the first slot and second slots of the pedal body, wherein arc angle of the second cleat is less than or equal to arc angle of the first cleat, and wherein arc angle of the third cleat is less than arc angle of the third slot and the fourth slot of the pedal body.

12. The pedal system of claim 1, wherein the first cleat is positioned on a top half of a surface of the cleat plate, the second cleat is positioned on a bottom half of the surface of the cleat plate, and the third cleat is positioned between the first cleat, the second cleat, and between all of the three slots.

13. A pedal, comprising:
an articulation axle attachably connectable with a crank arm of a bicycle;
a pedal body that is convex from front to rear and comprising a first slot, a second slot, a third slot, and a fourth slot, wherein the first slot, the second slot, the third slot, and the fourth slot are all arc-shaped, share a common center point of the pedal body, and defined through a width of the pedal body;
wherein the first slot of the pedal body is symmetrical to the second slot of the pedal body along the common center point of the pedal body, and wherein the third slot of the pedal body is symmetrical to the fourth slot of the pedal body along the common center point of the pedal body;
wherein arc lengths of the first slot and the second slot of the pedal body is greater than arc lengths of the third slot of the pedal body and the fourth slot from the common center point of the pedal body; and
wherein radii of the first slot and the second slot of the pedal body is greater than radii of the third slot of the pedal body and the fourth slot from the common center point of the pedal body.

14. A cleat plate, comprising:
a plate body that is concave from front to rear and attachably engageable with a pedal body;
a first cleat, a second cleat, a third cleat, and three slots; the three slots arranged in a triangular fashion, wherein the first cleat, the second cleat, and the third cleat are all arc-shaped and share a common center point of the cleat plate, wherein the plate body is connectable to a shoe via the three slots;
wherein the first cleat, the second cleat, and the third cleat are shaped and dimensioned to mate with slots of the pedal body;
wherein mating of the plate body with the pedal body allows for abutment of the first cleat, the second cleat, and the third cleat within the slots of the pedal body; and
wherein the first cleat is positioned on a top half of a surface of the plate body, the second cleat is positioned on a bottom half of the surface of the plate body, and the third cleat is positioned between the first cleat, the second cleat, and between all of the three slots.

15. The cleat plate of claim 14, wherein inside edges of the three slots of the cleat plate are chamfered.

* * * * *